(12) United States Patent  
Hyland et al.

(10) Patent No.: US 7,388,508 B2  
(45) Date of Patent: Jun. 17, 2008

(54) UNINTERRUPTIBLE POWER SUPPLY CONTROLLER AND METHOD

(75) Inventors: Robert F. Hyland, Rochester, MN (US); Joseph F. Prisco, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 11/428,664

(22) Filed: Jul. 5, 2006

(65) Prior Publication Data

US 2008/0007414 A1  Jan. 10, 2008

(51) Int. Cl.  
*G08B 21/00* (2006.01)

(52) U.S. Cl. .................. 340/635; 340/657; 307/66

(58) Field of Classification Search ........... 340/635, 340/657; 307/29, 66; 714/22  
See application file for complete search history.

(56) References Cited

U.S. PATENT DOCUMENTS 6,691,248 B1 * 2/2004 Nishijima et al. ............ 714/14  
7,030,035 B2 * 4/2006 Allen et al. .................. 713/340  
7,275,182 B2 * 9/2007 Egan et al. .................. 714/22  
2007/0114852 A1 * 5/2007 Lin et al. .................... 307/66

* cited by examiner

*Primary Examiner*—Phung T. Nguyen  
(74) *Attorney, Agent, or Firm*—Cantor Colburn LLP

(57) ABSTRACT

Exemplary embodiments include an uninterruptible power supply including: at least two inputs in operable communication with a plurality of switches; a plurality of AND gates in operable communication with the plurality of switches; a plurality of NOR gates in operable communication with the plurality of switches; a plurality of inverters in operable communication with an output of the NOR gates; a plurality of light emitting diodes in operable communication with the plurality of inverters and the plurality of AND gates, the light emitting diodes operable for signaling a condition of one of the plurality of inputs; and an output in operable communication with the light emitting diodes, wherein each of the inputs is connected to an uninterruptible power supply, the uninterruptible power supply signals a condition to the uninterruptible power supply controller, and the uninterruptible power supply controller signals the condition to the output if the condition is signaled by all uninterruptible power supplies connected to the uninterruptible power supply controller.

2 Claims, 4 Drawing Sheets

| UPS 1 | UPS 2 | OUTPUT OF NOR | OUTPUT OF INVERTER | iSERIES ACTION |
|---|---|---|---|---|
| 1 | 1 | 0 | 1 | |
| 1 | 0 | 0 | 1 | |
| 0 | 1 | 0 | 1 | |
| 0 | 0 | 1 | 0 | START CONTROLLED SHUTDOWN |

FIG. 4

UNINTERRUPTIBLE POWER SUPPLY CONTROLLER AND METHOD

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The present invention relates to power supply apparatus and methods of operation thereof, and more particularly, to uninterruptible power supplies (UPSs) and methods of operation thereof.

2. Description of Background

UPSs are commonly used to provide conditioned and/or auxiliary power to electronic equipment that provides critical functions, such as computer systems, telecommunications systems and medical equipment. Typically, UPSs can provide AC power from a backup source, such as a battery, generator or fuel cell, in the event that a utility power supply fails or becomes degraded.

A single UPS may be used to provide backup power to a large number of devices, for example, servers, monitors, coffee makers, refrigerators and the like. When the utility power is lost or becomes degraded, the UPS may provide power to all of these devices from the backup source. Conventional UPSs may include one or more load segments, i.e., groups of receptacles that can be independently controlled. Typically, power can only be removed from devices being powered by the UPS by turning off the UPS or by removing power from all of the devices plugged into a load segment. Furthermore, to conserve the amount of power used from the backup power source, devices, such as computers or servers, may be placed in a standby mode during a power loss. For example, operating systems running on servers may enter a reduced power state, but some power will still be supplied to the servers from the backup source. Thus, the devices in standby mode may still be drawing some power from the backup source. Furthermore, once the primary power source is restored, each of the devices placed in standby mode may have to be awakened manually before service can be fully restored. This can be quite time consuming if the UPS is used to provide power to an entire office building housing hundreds of servers, all of which were put in standby mode during the power loss.

Currently, pieces of information technology equipment (ITE) or data center infrastructure equipment (DCIE) are able to communicate with multiple UPSs. However, the communication between the ITE or DCIE and the UPSs implement an OR condition rather than an AND condition. The OR condition means the ITE or DCIE is notified if one UPS signals a condition and reacts to it regardless of the status on the second UPS. What is needed is a system that allows the ITE or DCIE to communicate with two UPSs and requires both UPSs to signal a condition before alerting the ITE or DCIE.

SUMMARY OF THE INVENTION

Exemplary embodiments include an uninterruptible power supply including: at least two inputs in operable communication with a plurality of switches; a plurality of AND gates in operable communication with the plurality of switches; a plurality of NOR gates in operable communication with the plurality of switches; a plurality of inverters in operable communication with an output of the NOR gates; a plurality of light emitting diodes in operable communication with the plurality of inverters and the plurality of AND gates, the light emitting diodes operable for signaling a condition of one of the plurality of inputs; and an output in operable communication with the light emitting diodes, wherein each of the inputs is connected to an uninterruptible power supply, the uninterruptible power supply signals a condition to the uninterruptible power supply controller, and the uninterruptible power supply controller signals the condition to the output if the condition is signaled by all uninterruptible power supplies connected to the uninterruptible power supply controller.

Exemplary embodiments also include a method for uninterruptible power supply control including: receiving a signal indicative of a condition from a first uninterruptible power supply; determining if the signaled condition is present in a second uninterruptible power supply; and signaling the condition to a piece of information technology equipment or data center infrastructure equipment if the condition is present in both the first and second uninterruptible power supplies.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution, which determines what allows the ITE or DCIE to communicate with two UPSs and require both UPSs to signal a condition before alerting the ITE or DCIE.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 illustrates a truth table corresponding to the circuit diagram for the uninterruptible power supply controller depicted in FIG. 3.

Figure 1:
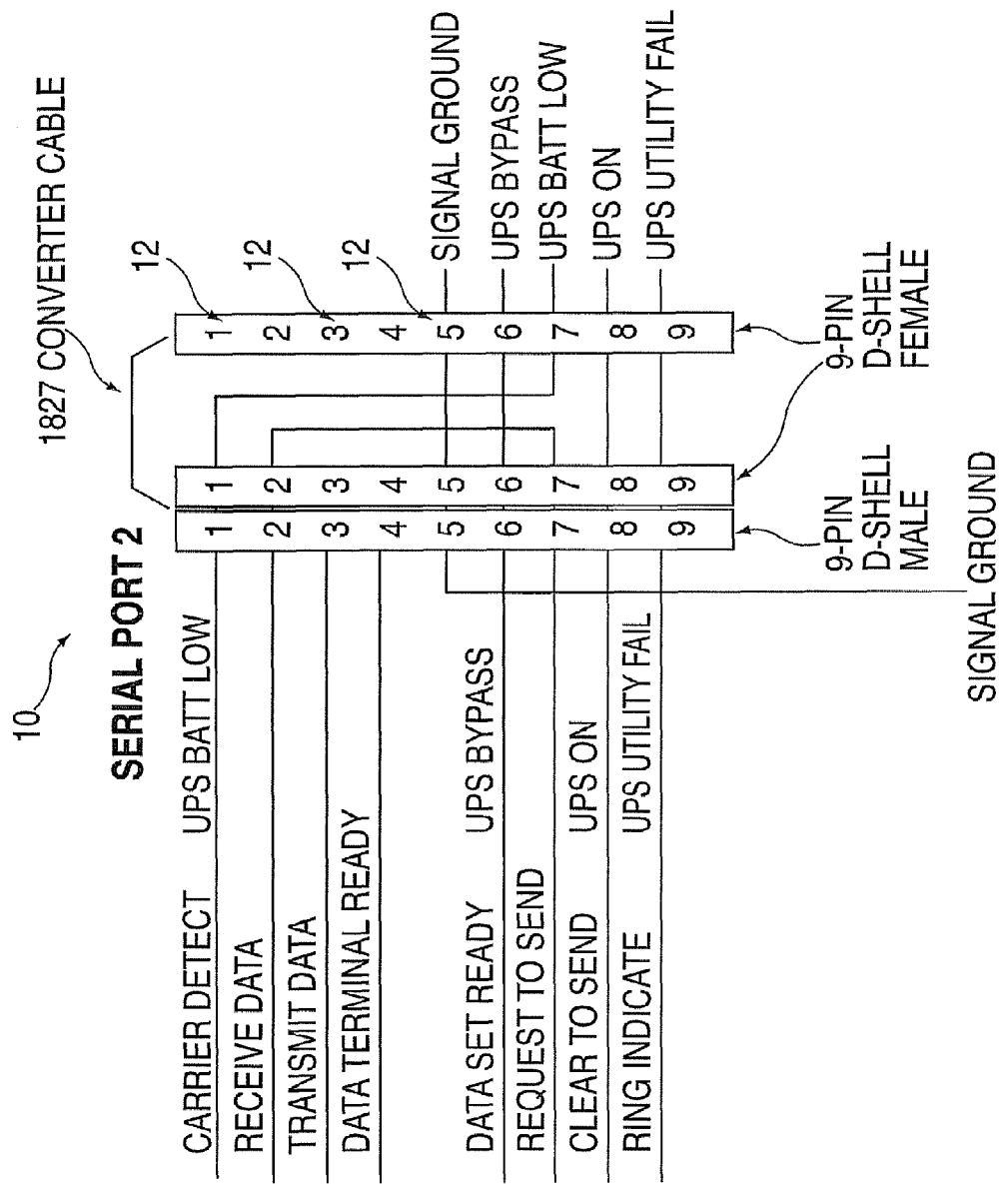
FIG. 1 illustrates a UPS hardware interface in accordance with exemplary embodiments.

The detailed description explains the preferred embodiments of the invention, together with advantages and features, by way of example with reference to the drawings.

DETAILED DESCRIPTION OF THE INVENTION

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention in detail. The examples used herein are intended merely to facilitate an understanding of ways in which the invention may be practiced and to further enable those of skill in the art to practice the invention. Accordingly, the examples should not be construed as limiting the scope of the invention.

Referring to FIG. 1, a UPS hardware interface in accordance with exemplary embodiments is depicted generally as 10. The UPS hardware interface 10 includes a plurality of communication pins 12. The communication pins 12 may be used for carrier detection and to communicate that the UPSs battery is low. The communication pins 12 can also be used for receiving data, transmitting data, and signaling that the ITE or DCIE is ready to receive or transmit data. Furthermore, one of the communication pins 12 may connect to a signal ground pin, one of the communication pins 12 may be a data set ready pin used to signal a bypass of the UPS, and one the communication pins 12 may be used to signal a utility fail of the UPS.

Figure 2:
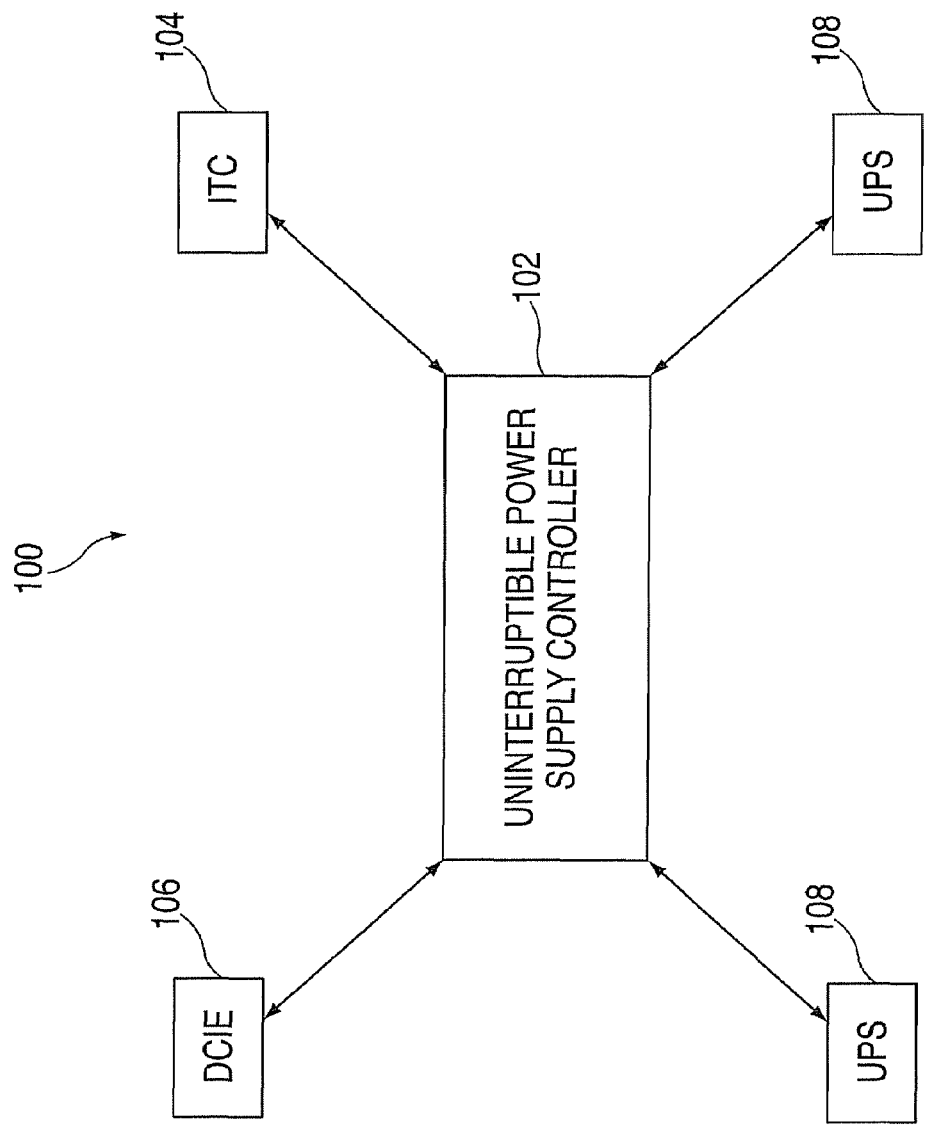
FIG. 2 illustrates a block diagram of a dual line cord uninterruptible power supply control system in accordance with exemplary embodiments.

Referring now to FIG. 2, a block diagram of a dual line cord uninterruptible power supply control system in accordance with exemplary embodiments is generally depicted as 100. The system 100 includes an uninterruptible power supply controller 102, an ITE 104 or a DCIE 106, and two or more UPSs 108. The uninterruptible power supply controller 102 is in electrical communication with the ITE 104, the DCIE 106, and the UPSs 108. The uninterruptible power supply controller 102 communicates with the UPSs 108 and upon the detection of a condition, such as a power failure, in both UPSs 108 the uninterruptible power supply controller 102 would notify the ITE 104 and the DCIE of the detected condition.

In exemplary embodiments, the uninterruptible power supply controller 102 is designed to accept up to four communication lines from different UPSs and supports up to two pieces of ITE or DCIE. Another version of the uninterruptible power supply controller 102 would accept two communication lines from two independent UPSs and support six pieces of ITE or DCIE that are receiving output power from the UPSs. Using the uninterruptible power supply controller 102, dual line cord ITE or DCIE can be connected to two separate UPSs to ensure that the ITE or DCIE is only notified of a condition if both UPSs signal the same condition.

Figure 3:
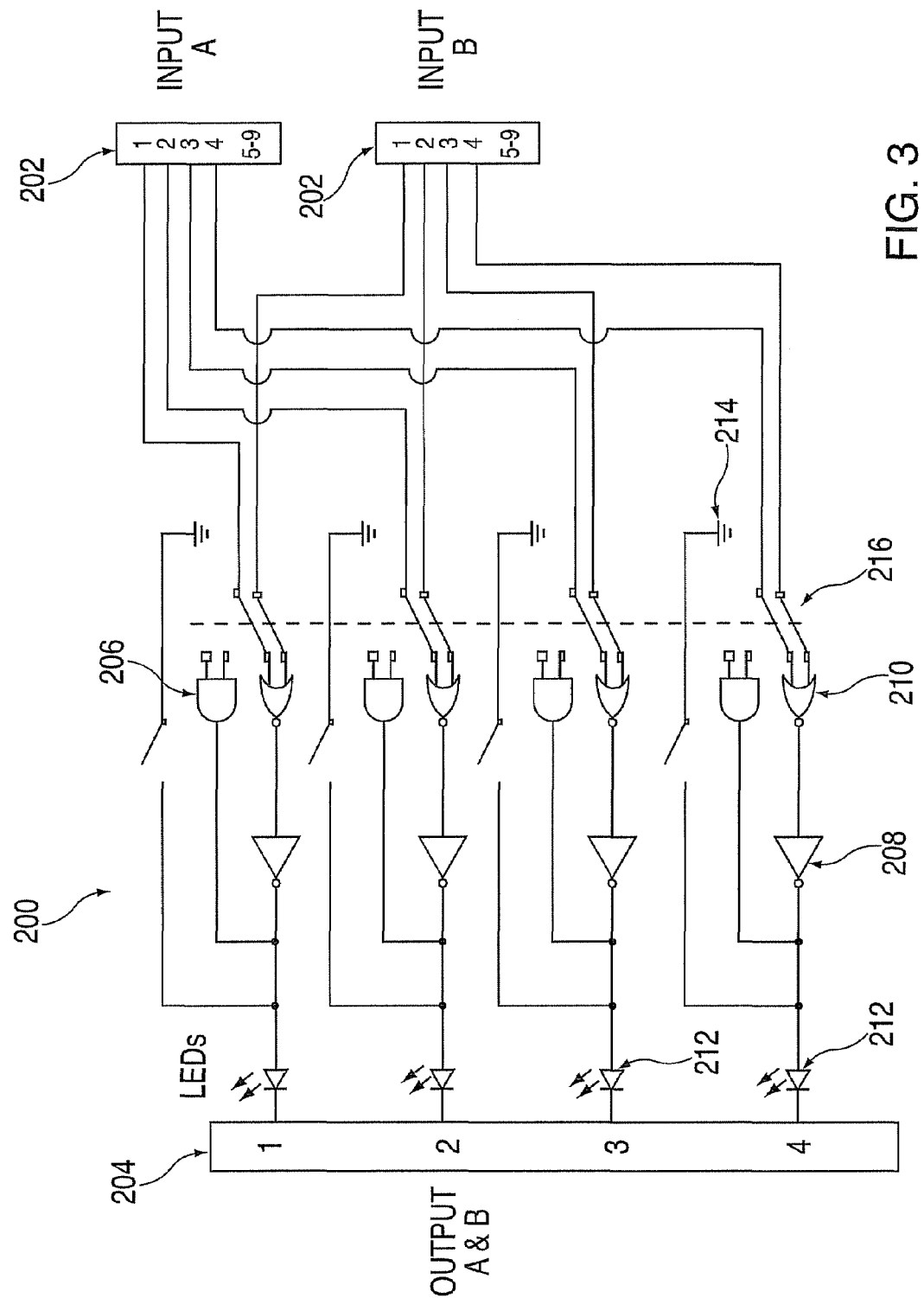
FIG. 3 illustrates a circuit diagram for an uninterruptible power supply controller in accordance with exemplary embodiments.

Referring now to FIG. 3, a circuit diagram of an uninterruptible power supply controller in accordance with exemplary embodiments is referred to generally as 200. The uninterruptible power supply controller 200 includes at least two inputs 202, one or more outputs 204, a plurality of AND gates 206, a plurality of inverters 208, a plurality of NOR gates 210, a plurality of light emitting diodes 212, a ground 214, and a plurality of switches 216. The inputs 202 may include a plurality of communications lines, as illustrated the inputs 202 include four communications lines. The communications lines of the inputs 202 are connected to the switches 216 which selectively connect the inputs to either the AND gate 206 or the NOR gates 210 based upon the state of the switch 216. In one embodiment, the switches 216 can be set for an active high or an active low. The output of the NOR gate 210 is connected to the inverter 208. The light emitting diodes 212 are connected to the output of the inverter 208, the AND gate 206, and the ground 214 via a switch 216, which acts as a bypass switch. In one embodiment, the ground 214 and the bypass switch 216 are designed to work independently of the rest of the logic in the circuit. The outputs 204 are connected to the light emitting diodes 212.

Referring now to FIG. 4, a truth table corresponding to the circuit diagram for the uninterruptible power supply controller 200 is generally depicted as 300. As shown, the uninterruptible power supply controller 200 will only signal a condition if that condition is detected in both the first and the second UPS. In the case that a condition is sensed in only one of the two UPSs the ITE or DCIE is not notified.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for uninterruptible power supply control comprising:
 receiving a signal indicative of a condition from a first uninterruptible power supply;
 determining if the signaled condition is present in a second uninterruptible power supply; and
 signaling the condition to a piece of information technology equipment or data center infrastructure equipment if the condition is present in both the first and second uninterruptible power supplies.

2. The method of claim 1, further comprising receiving a second signal indicative of the condition from the second uninterruptible power supply and determining if the signaled condition is present in the first uninterruptible power supply.

* * * * *